United States Patent
Kim et al.

(10) Patent No.: US 8,818,555 B2
(45) Date of Patent: Aug. 26, 2014

(54) PATH PLANNING APPARATUS OF ROBOT AND METHOD AND COMPUTER-READABLE MEDIUM THEREOF

(75) Inventors: Myung Hee Kim, Suwon-si (KR); Bok Man Lim, Seoul (KR); Kyung Shik Roh, Seongnam-si (KR); San Lim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 413 days.

(21) Appl. No.: 12/909,340

(22) Filed: Oct. 21, 2010

(65) Prior Publication Data
US 2011/0106307 A1     May 5, 2011

(30) Foreign Application Priority Data
Oct. 30, 2009    (KR) ........................ 10-2009-0104627

(51) Int. Cl.
*G05B 19/04*      (2006.01)
*B25J 9/06*      (2006.01)

(52) U.S. Cl.
USPC ............................................. 700/253; 901/1

(58) Field of Classification Search
USPC ................. 700/246, 253, 255, 258, 260–262; 901/1, 2, 49
See application file for complete search history.

(56) References Cited

U.S. PATENT DOCUMENTS

| | | | |
|---|---|---|---|
| 2004/0036437 A1* | 2/2004 | Ito .............................. | 318/568.12 |
| 2008/0065269 A1* | 3/2008 | Hasegawa ..................... | 700/260 |
| 2008/0086236 A1* | 4/2008 | Saito et al. .................... | 700/245 |
| 2008/0133055 A1* | 6/2008 | Hasegawa ..................... | 700/252 |
| 2008/0208391 A1* | 8/2008 | Hasegawa et al. ............. | 700/245 |
| 2009/0148035 A1* | 6/2009 | Ohno et al. .................... | 382/153 |
| 2009/0171503 A1* | 7/2009 | Takenaka et al. .............. | 700/250 |
| 2010/0185330 A1* | 7/2010 | Kwon ............................ | 700/261 |
| 2010/0235033 A1* | 9/2010 | Yamamoto et al. ............. | 701/26 |
| 2011/0077775 A1* | 3/2011 | Nagasaka et al. .............. | 700/254 |
| 2011/0301756 A1* | 12/2011 | Yoshiike et al. .............. | 700/253 |

* cited by examiner

*Primary Examiner* — Jason Holloway
(74) *Attorney, Agent, or Firm* — Staas & Halsey LLP

(57) ABSTRACT

An apparatus, method and computer-readable medium planning a path of a robot by planning an optimal path while satisfying a dynamic constraint. In a process of searching for a motion path from a start point to a goal point while extending a tree from a start point of a configuration space to generate a path, along which a manipulator of the robot is moved in order to perform a task, an optimal path is generated responsive to the dynamic constraint of the manipulator of the robot to generate stable motion satisfying momentum and Zero Moment Position (ZMP) constraint. Accordingly, path planning performance is improved and a path satisfying a kinematic constraint and a dynamic constraint is rapidly obtained.

12 Claims, 24 Drawing Sheets

FIG. 3
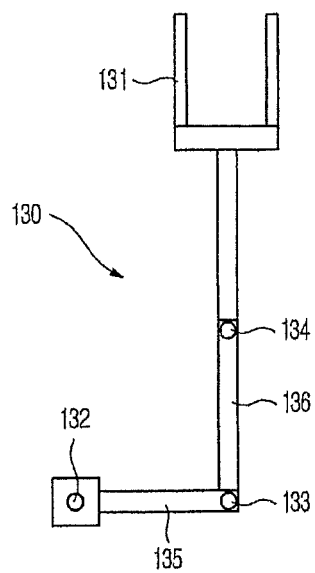 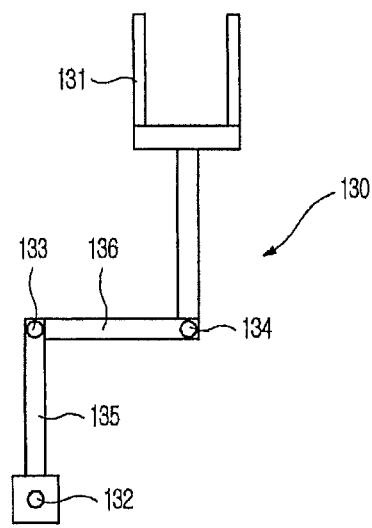
(a)             (b)

PATH PLANNING APPARATUS OF ROBOT AND METHOD AND COMPUTER-READABLE MEDIUM THEREOF

CROSS-REFERENCE TO RELATED APPLICATIONS

This application claims the benefit of Korean Patent Application No. 2009-0104627, filed on Oct. 30, 2009 in the Korean Intellectual Property Office, the disclosure of which is incorporated herein by reference.

BACKGROUND

1. Field

Example embodiments relate to a path planning apparatus planning an optimal path while satisfying a dynamic constraint, and a method and computer-readable medium thereof.

2. Description of the Related Art

In general, a mechanical device which performs motion similar to human motion using an electrical or magnetic mechanism is called a robot. Early robots included manipulators used for automated or unmanned tasks in manufacturing plants or industrial robots such as transportation robots. Robots also performed dangerous tasks, repetitive tasks or performed tasks requiring a large amount of force. Recently, research into a humanoid robot, which has joints similar to those of a human, and coexists with a human in a working and living space of the human to provide various services, has been actively conducted.

Such a humanoid robot performs tasks using a manipulator which may move similar to the arm or hand motion of a human by an electrical or mechanical mechanism. In most manipulators which are currently in use, several links are connected to each other. A connection portion between the links is called a joint. The motion characteristics of the manipulator are determined according to a geometrical relationship. Mathematical representation of such a geometrical relationship is called kinematics. In general, the manipulator moves an end effector of a robot with such kinematic characteristics in a direction (goal point) to perform a task.

In order to allow the manipulator to perform a given task (e.g., grasp an object), it is important to generate a motion path of the manipulator from an initial position (start point) before the manipulator performs a task to a final position (goal point) where the task may be performed, for example, where an object may be grasped. An example of a sampling based path planning method of planning a path to connect a start point and a goal point while satisfying a constraint such as collision avoidance where a manipulator does not collide with an obstacle within a working area includes a Rapidly-exploring Random Tree (RRT) algorithm.

The RRT algorithm uses a randomly sampled configuration in a Configuration Space (C-Space), where a manipulator or a humanoid robot performs a task. An example of the RRT algorithm includes a method of repeating a process of selecting a closest node from an initial start point to extend a tree and searching for a motion path to find a goal point. A node having a smallest goal score is selected from the tree using a goal function including a function of a distance from the goal point to an end-effector and a directional vector to extend the tree.

However, in the RRT algorithm of the related art, a closest node is selected without considering a dynamic constraint with time, i.e., a speed or balance, to extend a tree and generate a path. Speed and balance are then adjusted using an auto balancer. As a result, since the balance is not considered while the path is being generated, a path needs to be regenerated if the speed and balance are not adjusted using the auto balancer. Therefore, a speed to find a path is decreased and a time to plan a final path is increased.

Accordingly, as a method of considering a dynamic state when a path is generated, a method of calculating torque of a selected node and discarding the selected node if a predetermined torque constraint is not satisfied has been suggested. However, since this method does not consider time, a convergence speed is decreased if a dimension is increased. In addition, in a dynamic state where speed or balance is important, a constraint is not satisfied.

SUMMARY

Therefore, it is an aspect of the example embodiments to provide a path planning apparatus of a robot which improves path planning performance by planning a path based on a sample which considers a dynamic constraint, and a method and computer-readable medium thereof.

The foregoing and/or other aspects are achieved by providing a method of planning a path of a robot, the method including forming, by at least one processor, a configuration space having a start point, a goal point and obstacle information in order to generate a motion path of a manipulator of the robot, connecting, by the at least one processor, a certain point randomly sampled in the configuration space and a node having a smallest goal score to obtain a sample gnew satisfying a constraint including obstacle avoidance. projecting, by the at least one processor, the sample gnew in consideration of a dynamic constraint, adding, by the at least one processor, a projection sample gprojected to extend a tree, and connecting, by the at least one processor, the start point and the goal point by the extension of the tree to generate the path responsive to the dynamic constraint.

The start point may be a node obtained by forming a configuration on the configuration space at an initial position before the manipulator of the robot performs a task.

The goal point may be a node obtained by forming a configuration on the configuration space at a goal position where the manipulator of the robot performs a task.

In the extension of the tree, a distance and a time of an extension section may be set to satisfy the dynamic constraint.

The method may further include estimating the dynamic constraint of the manipulator of the robot, and the dynamic constraint may be set to a Center Of Gravity (COG) and one of a Zero Moment Position (ZMP) of the robot and an experimentally obtained momentum value.

The projecting of the sample gnew may include checking whether the COG of the robot is within a supporting polygon to determine whether the sample gnew satisfies static stability, and enabling the ZMP of the robot to fall within the supporting polygon to satisfy dynamic stability of the robot.

The dynamic stability of the robot may be satisfied by enabling the COG and the ZMP of the robot to fall within the supporting polygon to maintain balance of the robot.

The foregoing and/or other aspects are achieved by providing a method of planning a path of a robot, the method including recognizing, by at least one processor, a start point and a goal point respectively corresponding to an initial configuration and a goal configuration of a manipulator of the robot, estimating, by the at least one processor, a dynamic constraint of the manipulator of the robot, searching, by the at least one processor, for a path satisfying a constraint including obstacle avoidance from the start point to the goal point, and generating, by the at least one processor, the path satisfying the dynamic constraint when searching for the path.

The searching of the path may include connecting a certain point randomly sampled in the configuration space having the start point and the goal point and a node having a smallest goal score to obtain a sample gnew satisfying the constraint, adding the sample gnew to the tree to extend the tree until the sample gnew reaches the goal point, and searching for the path to connect the start point and the goal point by the extension of the tree.

The generating of the path may include projecting the sample gnew in consideration of the dynamic constraint, adding a projection sample gprojected to the tree to generate a search graph to extend the tree, and connecting the start point and the goal point using the search graph to generate the path responsive to the dynamic constraint.

The foregoing and/or other aspects are achieved by providing an apparatus planning a path of a robot, the apparatus including a recognizer configured to recognize a start point and a goal point respectively corresponding to an initial configuration and a goal configuration of a manipulator of the robot and a path planning generator configured to form a configuration space to generate a motion path of the manipulator of the robot, to estimate a dynamic constraint of the manipulator of the robot in the configuration space, and to generate a path to connect the start point and the goal point responsive to the dynamic constraint.

The path planning generator may connect a certain point randomly sampled in the configuration space and a node having a smallest goal score to obtain a sample gnew satisfying a constraint including obstacle avoidance, project the sample gnew responsive to the dynamic constraint, and add a projection sample gprojected to a tree to extend the tree.

The path planning generator may check whether a Center Of Gravity (COG) of the robot is within a supporting polygon to determine whether the sample gnew satisfies static stability, and project the sample gnew to satisfy dynamic stability of the robot, if the sample gnew satisfies the static stability.

According to an apparatus, method and computer-readable medium planning a path of a robot, in a process of searching for a motion path from a start point to a goal point while extending a tree in a configuration space in which a manipulator of the robot performs a task, an optimal path is generated responsive to a dynamic constraint of the manipulator of the robot to generate stable motion satisfying momentum and Zero Moment Position (ZMP) constraint. Accordingly, path planning performance is improved and a path satisfying a kinematic constraint and a dynamic constraint is rapidly obtained.

The foregoing and/or other aspects are achieved by providing at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a view schematically showing the configuration of a kinematic redundant actuation manipulator of a robot according to example embodiments;

DETAILED DESCRIPTION

Figure 1:
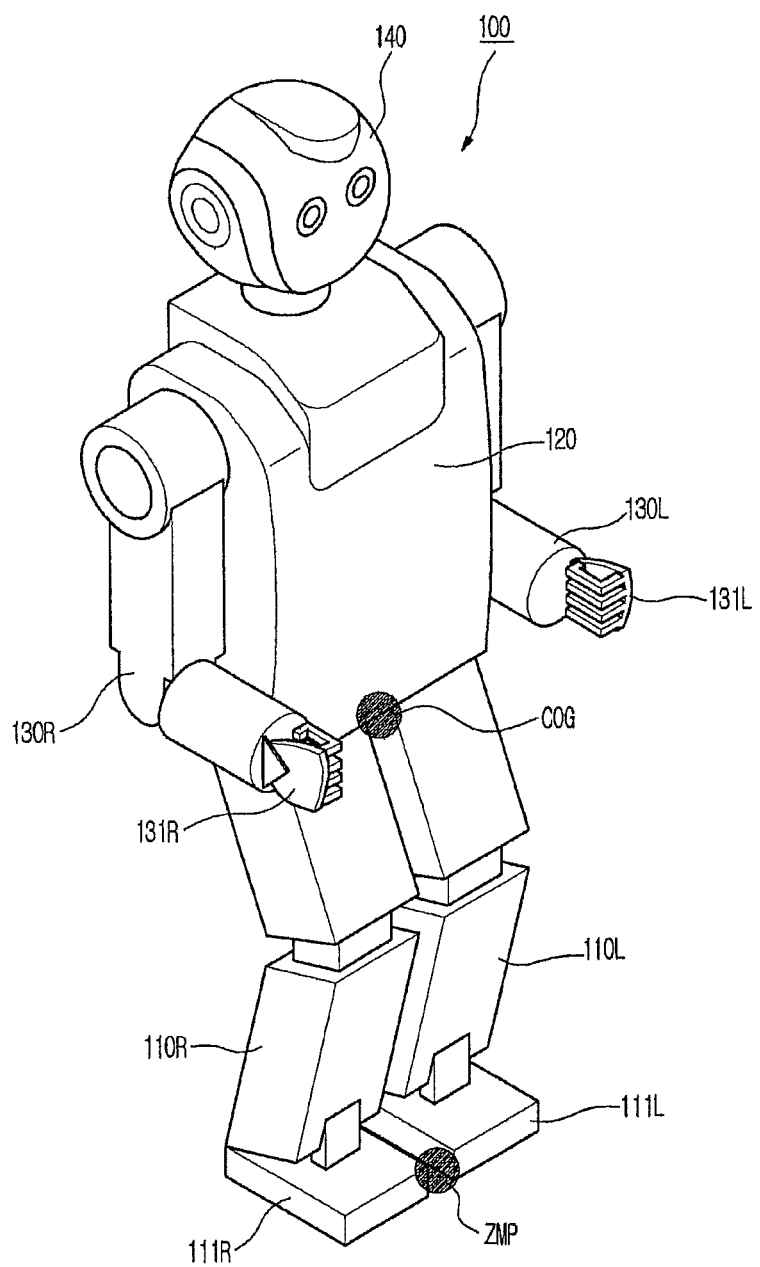
FIG. 1 is an appearance view showing an example of a robot according to example embodiments.

Reference will now be made in detail to the embodiments, examples of which are illustrated in the accompanying drawings, wherein like reference numerals refer to like elements throughout.

FIG. 1 is an appearance view showing an example of a robot according to example embodiments.

In FIG. 1, the robot 100 according to example embodiments is a bipedal robot which walks erect using two legs 110R and 110L similar to a human, and includes a trunk 120, two arms 130R and 130L and a head 140 mounted on an upper side of the trunk 120, and feet 111R and 111L and hands 131R and 131L respectively mounted on the front ends of the two legs 110R and 110L and the arms 130R and 130L.

In the reference numerals, R and L denote right and left, respectively. A Center Of Gravity (COG) denotes a center of gravity of the robot 100, and a Zero Moment Position (ZMP) denotes a point where moment of a roll direction (an x-axis direction which is a walking direction of the robot) and a pitch direction (a y-axis direction which is a left-and-right stride direction of the robot) become 0 on a contact surface between the feet 111R and 111L of the robot 100 and the ground.

Figure 2:
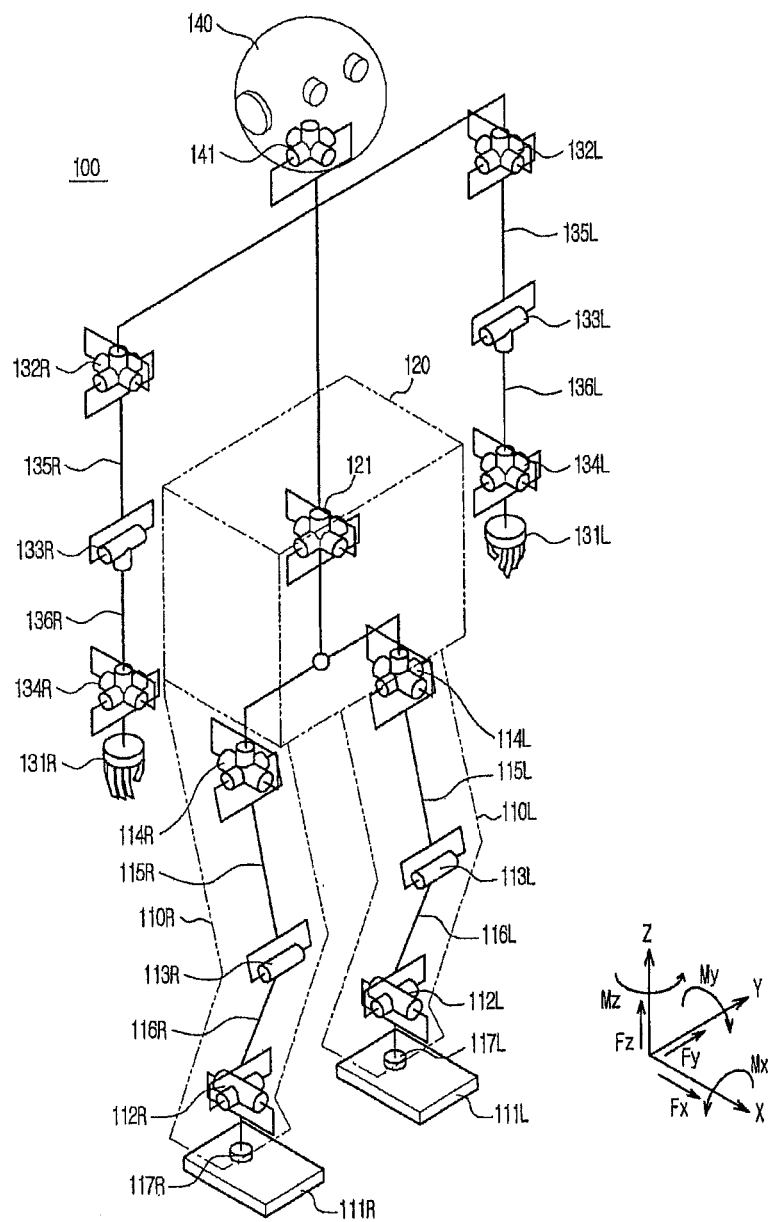
FIG. 2 is a view showing the structure of the main joints of the robot shown in FIG. 1.

FIG. 2 is a view showing the structure of the main joints of the robot shown in FIG. 1.

In FIG. 2, the two arms 130R and 130L respectively include shoulder joints 132R and 132L, elbow joints 133R and 133L and wrist joints 134R and 134L allowing the portions corresponding to the shoulders, the elbows and the wrists of the robot 100 to rotate. The shoulder joints 132R and 132L are located on both ends of the upper side of the trunk 120.

The shoulder joints 132R and 132L of the arms 130R and 130L may move in an x axis (roll axis), a y axis (pitch axis) and a z axis (yaw axis), the elbow joints 133R and 133L may move in the y axis (pitch axis), and the wrist joints 134R and 134L may move in the x axis (roll axis), the y axis (pitch axis) and the z axis (yaw axis).

The two arms 130R and 130L respectively include upper links 135R and 135L to connect the shoulder joints 132R and 132L and the elbow joints 133R and 133L and lower links 136R and 136L to connect the elbow joints 133R and 133L and the wrist joints 134R and 134L to move with a predetermined degree of freedom according to the movable angle ranges of the joints 132R and 132L, 133R and 133L, and 134R and 134L.

The two legs 110R and 110L respectively include ankle joints 112R and 112L, knee joints 113R and 113L and hip joints 114R and 114L allowing the portions corresponding to the ankles, the knees and the hips of the robot 100 to rotate. The hip joints 114R and 114L are located on both ends of the lower side of the trunk 120.

The ankle joints 112R and 112L of the legs 110R and 110L may move in the x axis (roll axis) and the y axis (pitch axis), the knee joints 113R and 113L may move in the y axis (pitch axis), and the hip joints 114R and 114L may move in the x axis (roll axis), the y axis (pitch axis) and the z axis (yaw axis).

In addition, the two legs 110R and 110L respectively include thigh links 115R and 115L to connect the hip joints 114R and 114L and the knee joints 113R and 113L and lower leg links 116R and 116L to connect the knee joints 113R and 113L and the ankle joints 112R and 112L to walk with a predetermined degree of freedom according to the movement of the joints 112R and 112L, 113R and 113L, and 114R and 114L.

Force and Torque (F/T) sensors 117R and 117L are mounted between the two feet 111R and 111L and the ankles of the legs 112R and 112L allowing three-directional components Fx, Fy and Fz of force received from the feet 111R and 111L and three-directional components Mx, My and Mz of moment to be measured and ZMP information to be provided.

The trunk 120 connected to the two legs 110R and 110L includes a waist joint 121 to rotate the portion corresponding to the waist of the robot 100, and the head 140 connected to the trunk 120 includes a neck joint 141 to rotate the portion corresponding to the neck of the robot 100.

In example embodiments, the two arms 130R and 130L configure a manipulator 130 to perform a motional task, and the two hands 131R and 131 provided on the front end of the manipulator 130 configure an end effector 131 to grasp a goal (object). These are schematically shown in FIG. 3.

FIG. 3 is a view schematically showing the configuration of a kinematic redundant actuation manipulator of a robot according to example embodiments.

In FIG. 3, the manipulator 130 is manufactured to move similar to the arm or hand motion of a human by an electrical or mechanical mechanism. In most manipulators 130 which are currently used, several links 135 and 136 (in detail, an upper link or a lower link) are connected to each other by several joints 132, 133 and 134 (in detail, shoulder joints, elbow joints or wrist joints). The motional characteristics of the manipulator 130 are determined according to a geometrical relationship between the links 135 and 136 and the joints 132, 133 and 134. Mathematical representation of such a geometrical relationship is kinematics. In general, the manipulator 130 moves the end effector 131 with such kinematic characteristics in a direction to perform a task. The manipulator 130 according to example embodiments moves the end effector 131 to a goal point to grasp a goal object using links 135 and 136. Thus, the positions and directions may be adjusted.

As shown in FIG. 3, the shape of the manipulator 130 which moves to the goal point in order to grasp the same object may be variously changed as shown in FIG. 3A or 3B.

Figure 4:
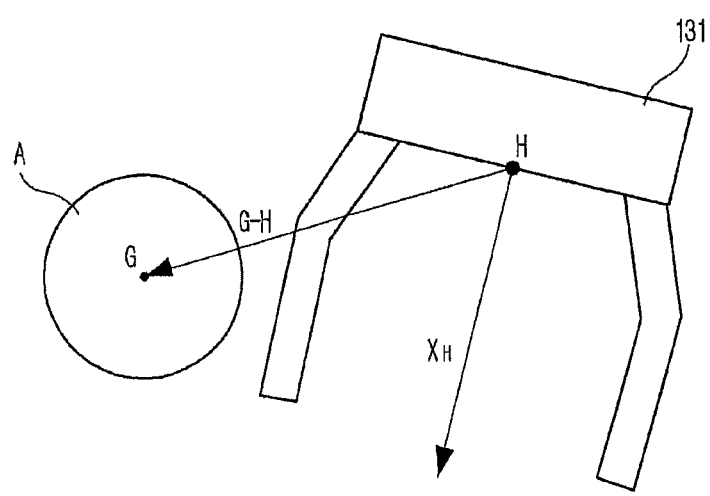
FIG. 4 is a view of a model of a process of grasping an object by the manipulator of FIG. 3.

FIG. 4 is a view of a model of a process of grasping an object using the manipulator of FIG. 3.

In FIG. 4, a goal function which is satisfied when the manipulator 130 grasps a goal object A is expressed by Equation 1.

$$\text{Goal Function} = \|G-H\| + \alpha^* |(G-H)^* x_H - 1| \qquad \text{Equation 1}$$

where, G denotes a goal point to grasp the goal object A by the manipulator 130, H is a center of the end effector 131, $\|G-H\|$ denotes a distance from the end effector 131 to the goal point G, $|(G-H)^* x_H - 1|$ denotes a directional vector, and $\alpha$ denotes a constant.

Figure 5:
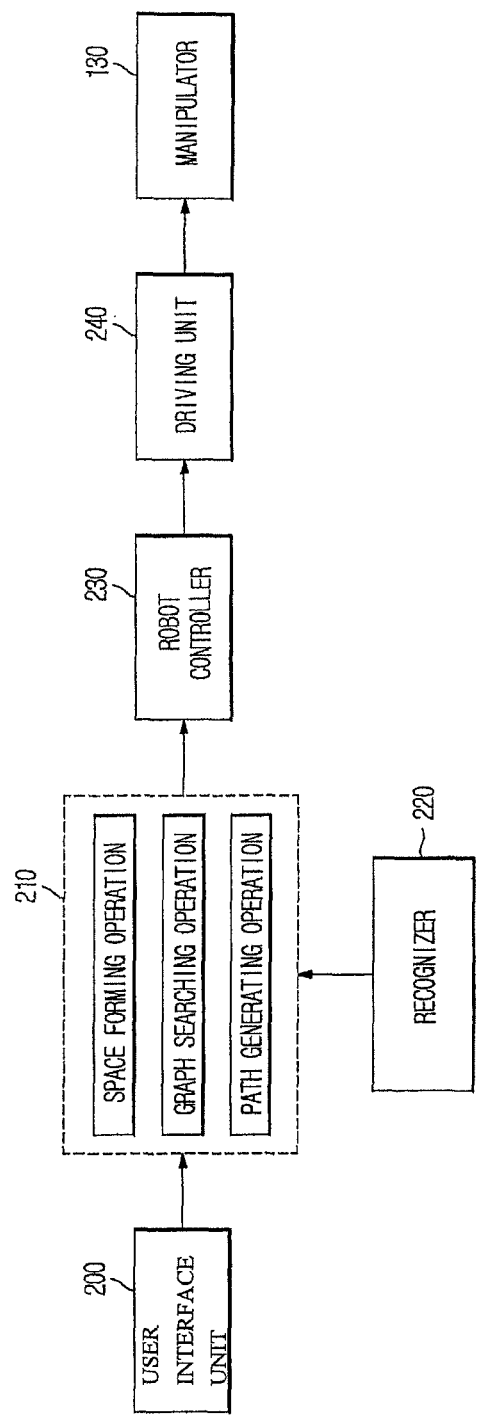
FIG. 5 is a control block diagram of an apparatus planning a motion path of a manipulator in a robot according to example embodiments.

FIG. 5 is a control block diagram of an apparatus planning a motion path of a manipulator in a robot according to example embodiments, which may include a user interface unit 200, a path planning generator 210, a recognizer 220, a robot controller 230, and a driving unit 240.

The user interface unit 200 allows a user to input a task command (e.g., a grasping command to grasp an object placed on a table) of the robot 100 and, more particularly, the manipulator 130, by manipulating a switch or via voice.

The path planning generator 210 generates a path plan to control the movement of the manipulator 130 while satisfying a dynamic constraint according to the task command input via the user interface unit 200 and sends the path plan to the robot controller 230. A method of generating a path plan by the path plan generator 210 includes a space forming operation, a graph searching operation and a path generating operation.

In the space forming operation, a Configuration Space (C-Space) to generate a path while satisfying a constraint such as collision avoidance of an obstacle is detected. The term "configuration" refers to a set of variables to represent the position and the direction of the moving manipulator 130, and all spaces occupied by configurations are called the C-Space.

In the graph searching operation, a connected network representing a searchable path to generate an optimal path is generated. Configurations are randomly extracted based on the C-Space formed by a cell decomposition method, such as a tree, with respect to the moving manipulator 130, nodes are generated by a method of excluding a configuration colliding with an obstacle space, and a search tree to connect the generated nodes is generated, thereby obtaining a search graph to generate a path.

In the path generation operation, an obstacle space is avoided to not cause a collision in the connected network of the given search space, and an optimal path connecting a start point and a goal point while satisfying a dynamic constraint is generated.

The recognizer 220 recognizes information which is given in order to perform a task command by the manipulator 130, for example, a configuration (start point) at an initial position of the manipulator 130 before performing the task command, a configuration (goal point) at a goal point of the manipulator 130 where the task command may be performed, and obstacles in the C-space between the start point and the goal point The recognizer 220 sends the information to the path plan generator 210. This recognized information is used to plan the motion path of the manipulator 130 by the path plan generator 210.

The robot controller 230 controls the driving unit 240 according to the path plan received from the path plan generator 210, drives the manipulator 130, and controls the movement of the manipulator 130.

Hereinafter, the robot having the above-described structure, the method of planning the path thereof, and the effects thereof will be described.

Figure 6:
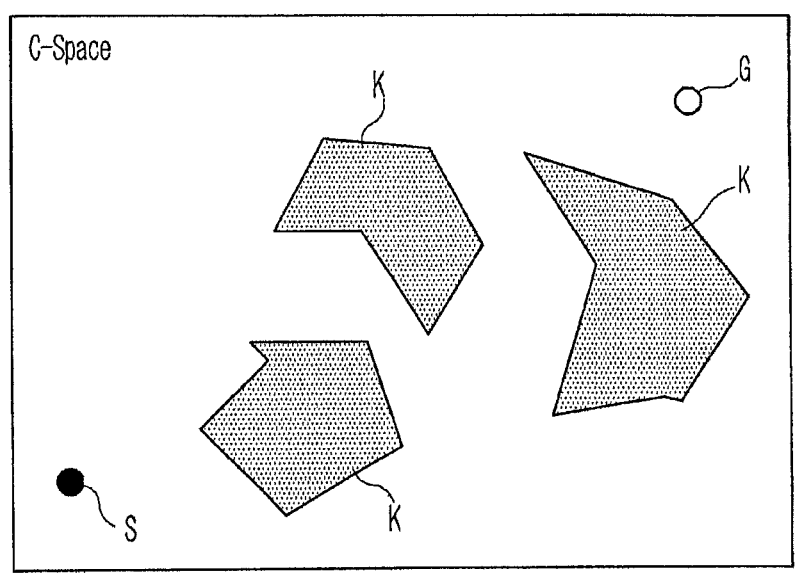
FIG. 6 is a view showing a configuration space according to example embodiments.

FIG. 6 is a view showing a C-Space according to example embodiments.

In FIG. 6, the C-Space is a dynamic space where the manipulator 130 performs a task. S denotes a start point of the configuration of an initial position before the manipulator 130 performs the task by one node in the C-Space. G denotes a goal point. The configuration of a goal position where the manipulator 130 may perform the task such as grasping an object is formed by one node in the C-space. K denotes a C-Space of an obstacle between the start point S and the goal point G.

An example of a method of planning a path while satisfying a constraint such as collision avoidance of an obstacle K, includes a sampling based motion planning method. As an example of such a method, there is a Rapidly-exploring Random Tree (RRT) method.

The RRT algorithm detects a path of the manipulator 130 having a tree T formed by one node which is visualized and a constraint such as collision avoidance of the obstacle satisfied from the start point S to the goal point G. The extension of the tree T is performed by selecting a closest node out of nodes belonging to the tree T in a configuration g randomly sampled in the C-space, connecting a virtual line, including a sample $g_{new}$ in the tree if the sample $g_{new}$ in the virtual line satisfies the constraint, and continuously extending the tree T until the sample $g_{new}$ reaches the goal point G. The path plan generation of the example embodiments using the RRT algorithm will be described in detail with reference to FIGS. 7 to 16.

FIGS. 7 to 16 are views of a process of generating a tree in a C-Space according to example embodiments.

Figure 7:
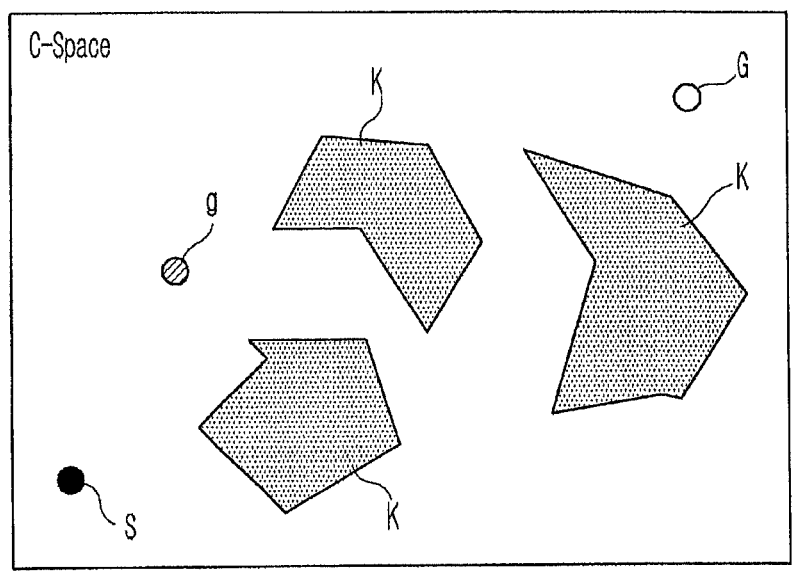
FIGS. 7 to 16 are views of a process of generating a tree in a configuration space according to example embodiments.
Figure 8:
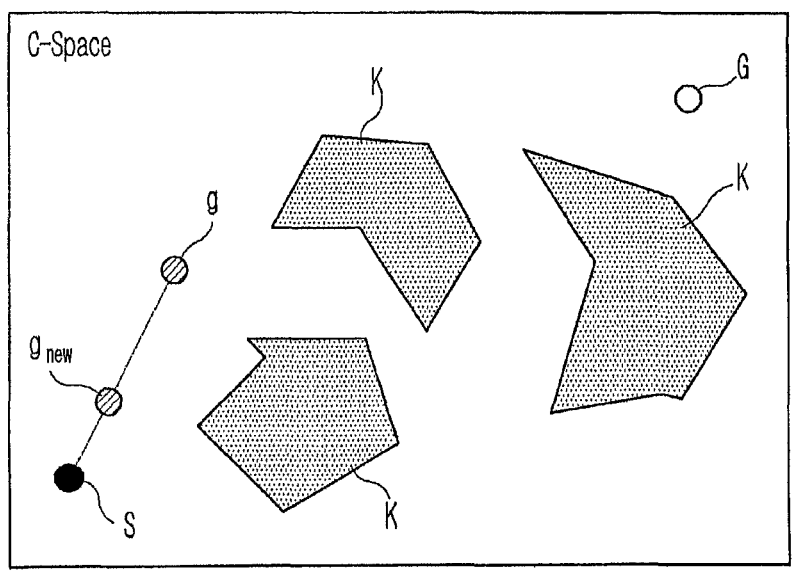
Figure 9:
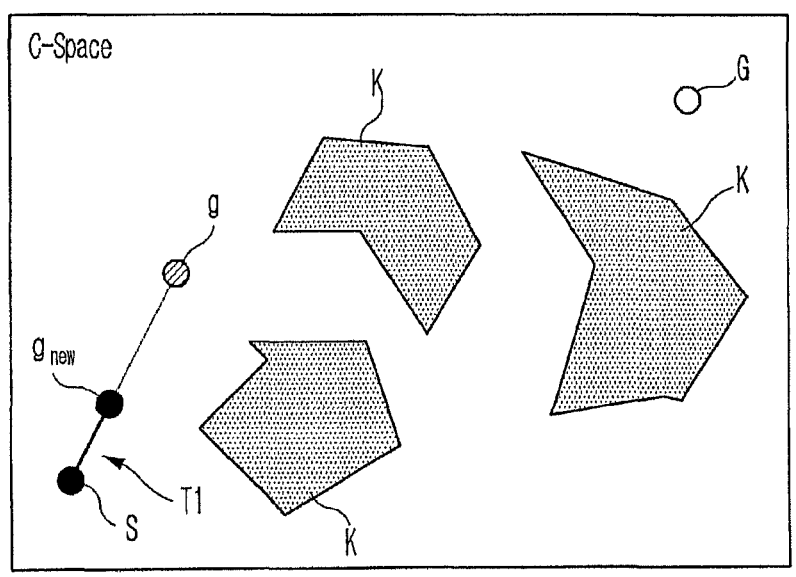
Figure 10:
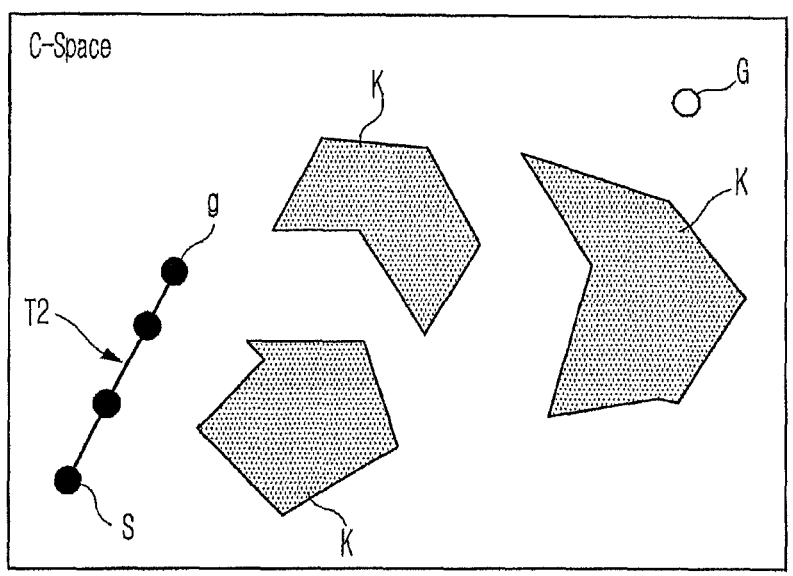
Figure 11:
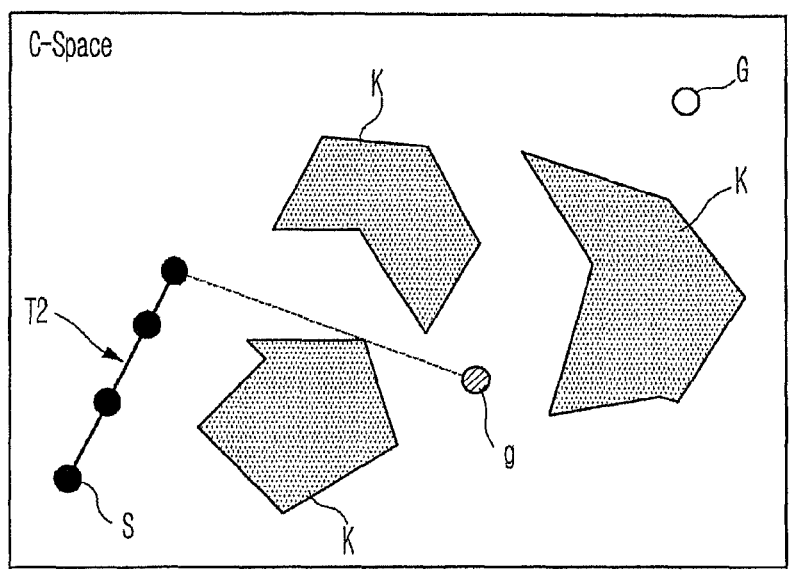
Figure 12:
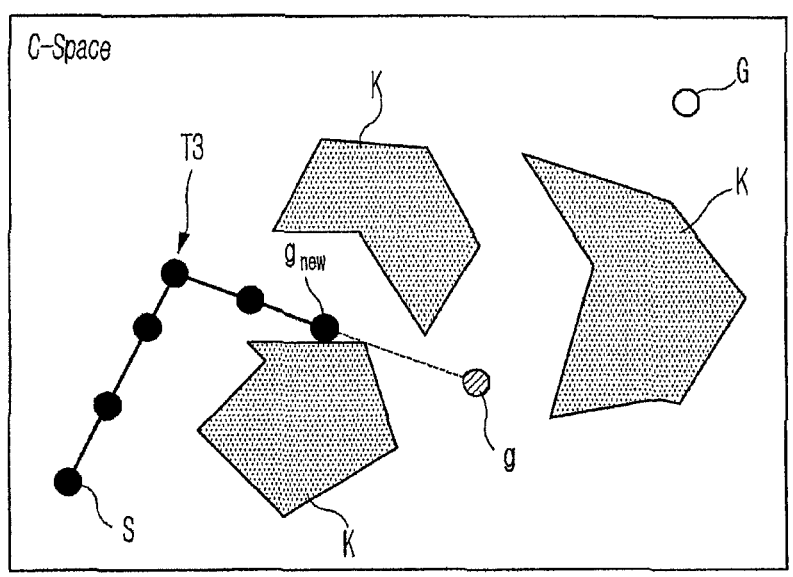
Figure 13:
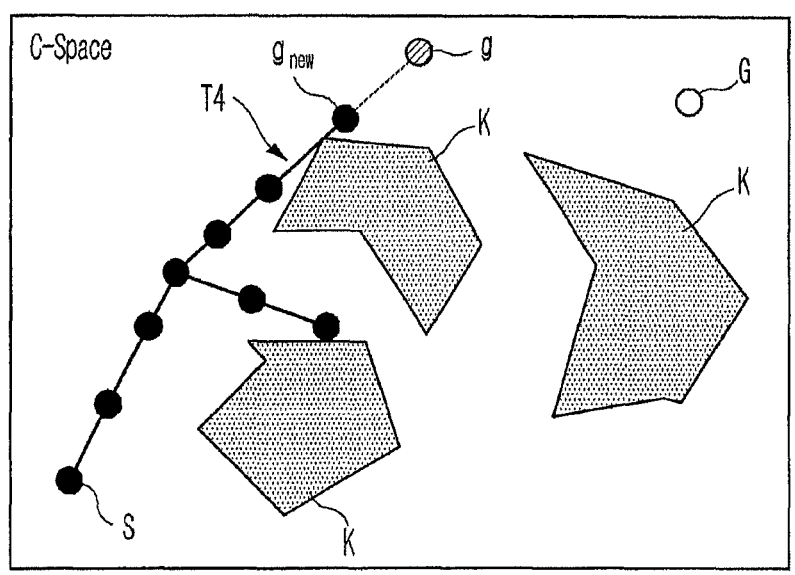
Figure 14:
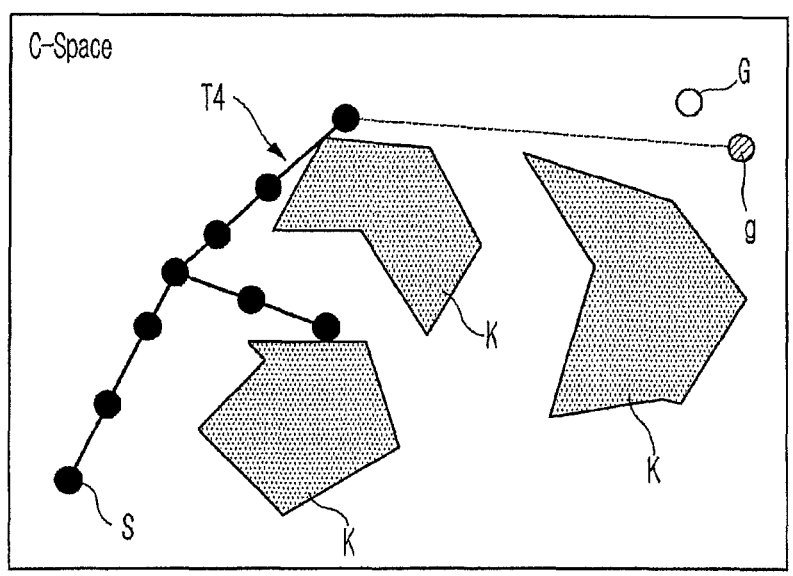
Figure 15:
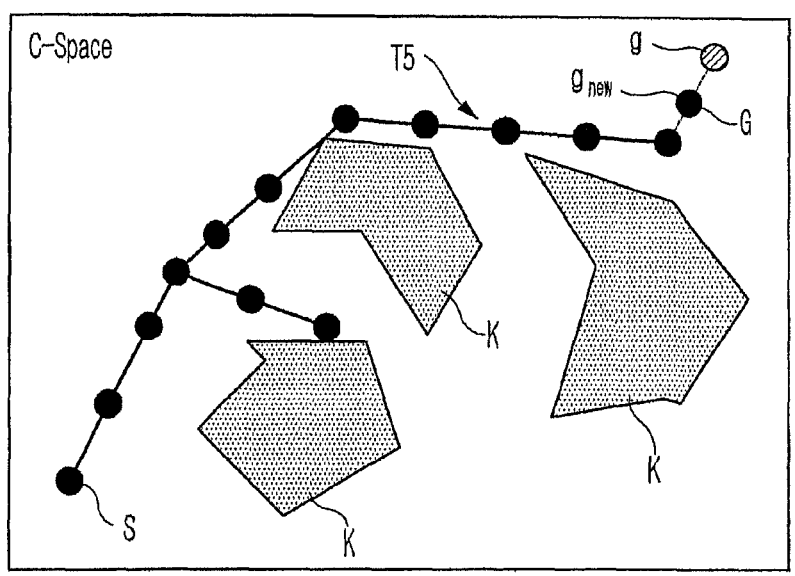
Figure 16:
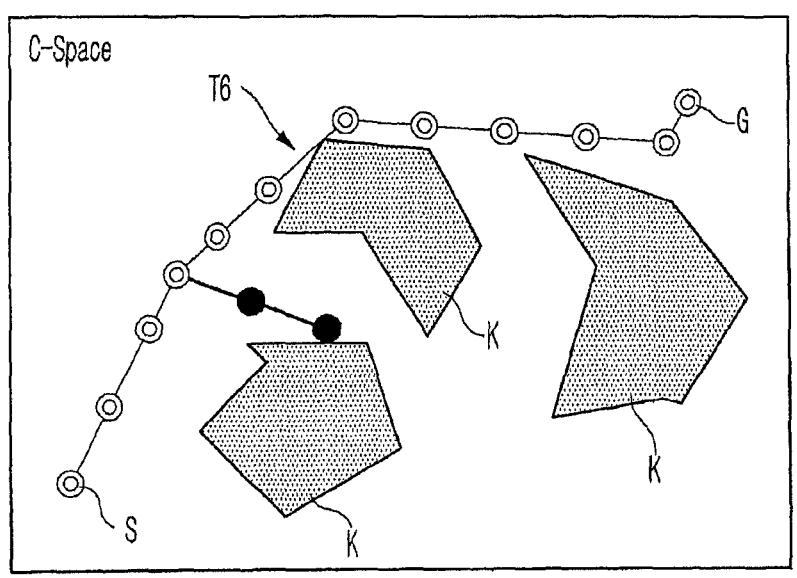

In the C-Space the start point S, the goal point G and the obstacle K are displayed, a certain point g is randomly sampled (see FIG. 7), the randomly sampled point g and a node having a smallest goal score are connected by a dotted virtual line, a new sample $g_{new}$ separated from the start point by a predetermined distance is generated (see FIG. 8), the constraint (joint limit, collision avoidance or the like) and a goal score of the new sample $g_{new}$ are checked, and the new sample $g_{new}$ is added to the tree T1 if the constraint and the goal score condition are satisfied (see FIG. 9). The above-described process is repeatedly performed until the new sample $g_{new}$ is constantly extended and the tree T1 is extended to a tree T2 (see FIG. 10).

The tree extension process shown in FIGS. 7 to 10 is repeatedly performed to add new samples $g_{new}$ to the tree allowing a tree T3 to be extended to a tree T4 (see FIGS. 11 to 14). Such a process is repeatedly performed to allow the extended node to advance toward the goal point G. At this time, if the extended node satisfies a goal function, the graph searching operation is performed and the motion path of the manipulator 130 is formed (see FIGS. 15 and 16).

If a dynamic constraint such as a speed or balance is not considered when the tree extension of the RRT algorithm is performed, task motion may not be rapidly and stably generated.

Accordingly, in the example embodiments, an RRT path planning algorithm satisfying a dynamic constraint (momentum constraint) in the existing RRT algorithm satisfying a constraint such as collision avoidance of the obstacle K is suggested. Therefore, when a path is planned, a method of projecting a sample $g_{new}$ to satisfy momentum is used. If the projection method is used, although a momentum limit of a certain state is given, the RRT path may be planned accordingly. In addition, a balancing constraint may be given using moment, and motion satisfying the balancing constraint may have a high speed.

Figure 17:
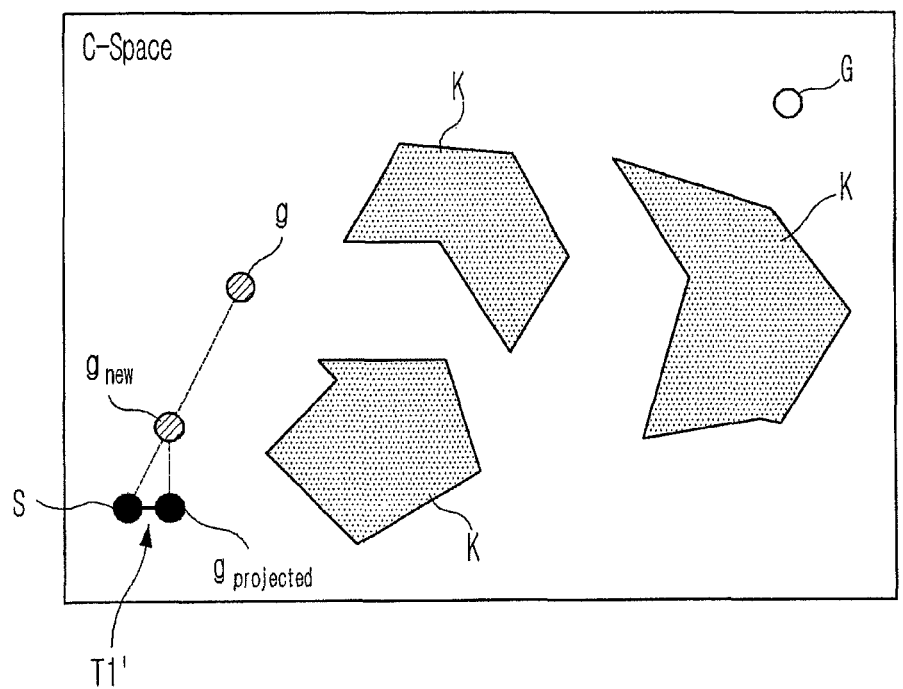
FIG. 17 is a view of a process of projecting a sample in consideration of a dynamic constraint in a configuration space according to example embodiments.

FIG. 17 is a view of a process of projecting a sample responsive to a dynamic constraint in a C-Space according to example embodiments.

In the C-Space where the start point S, the goal point G and the obstacle K are displayed, a certain point g is randomly sampled (see FIG. 7), the randomly sampled point g and a node having a smallest goal score are connected by a dotted virtual line, and a new sample $g_{new}$ separated from the start point by a predetermined distance is generated (see FIG. 8).

A projection sample $g_{projected}$ is generated by projecting the new sample $g_{new}$ to satisfy the dynamic constraint. The method of projecting the sample $g_{new}$ to satisfy the dynamic constraint is as follows.

First, it is checked whether the sample $g_{new}$ satisfies static stability. If the static stability is satisfied, the sample $g_{new}$ is selected. At this time, the method of checking static stability is performed by calculating a Center Of Gravity (COG) of the robot 100 and checking whether the COG is within a supporting polygon of the robot 100. The supporting polygon is calculated by the feet 111R and 111L (more particularly, the soles of the feet) of the robot 100 supported on the ground.

If the COG is within the supporting polygon of the robot 100, the sample $g_{new}$ is projected to satisfy dynamic stability of the robot 100. The method of satisfying the dynamic stability of the robot 100 is achieved by enabling a Zero Moment Position (ZMP) to fall within the supporting polygon.

The ZMP indicates a point where the moment of the roll axis (x-axis direction) and the pitch axis (y-axis direction) becomes 0 on the contact surface between the feet 111R and 111L (more particularly, the soles of the feet) and the ground.

Figure 18:
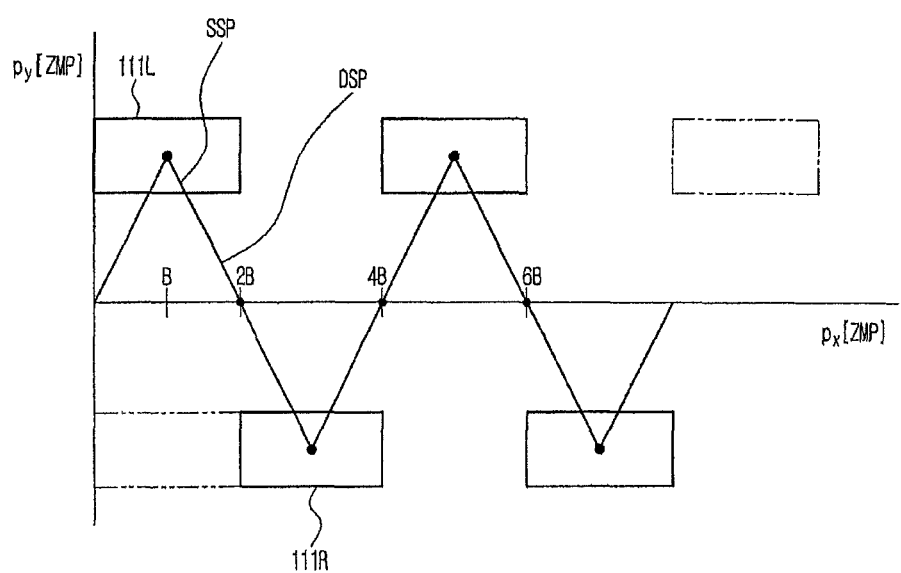
FIG. 18 is a view showing a Zero Moment Position (ZMP) locus of a robot according to example embodiments.

FIG. 18 is a view showing a ZMP locus of a robot according to example embodiments, where the ZMP locus of the walking direction (x-axis direction) and the left-and-right stride direction (y-axis direction) of the robot 100 is represented on an x-y plane.

In FIG. 18, B denotes half of one stride.

As shown in FIG. 18, in order to enable the robot 100 to perform stable walking motion, points where a sum of moments on the ground becomes 0, for example, points where the feet 111R and 111L take a step forward, are determined in advance. The ZMP locus to determine a support state such as a Double Support Phase (DSP)/Single Support Phase (SSP) in advance is set.

The points where the feet 111R and 111L of the robot 100 take a step forward are generally described by a periodic function, and the support states are used to transfer the ZMP. While a moved leg takes a step forward in the SSP state, the ZMP is held within the sole of the foot of a support leg. In the DSP state, the ZMP is rapidly transferred from the inside of the sole of the foot of the support leg to the inside of the sole of the foot of the moved leg. In order to enable the robot 100 to walk continuously and stably, such processes are repeated.

In order to enable the ZMP to fall within the supporting polygon, momentum needs to satisfy predetermined reference momentum. Linear momentum and angular momentum of the robot 100 are calculated using Equation 2.

$$\begin{bmatrix} P \\ L \end{bmatrix} = \begin{bmatrix} mE & -mr_{b \to c} \\ 0 & I \end{bmatrix} \begin{bmatrix} v_B \\ w_B \end{bmatrix} + \begin{bmatrix} M_{constrainted} \\ H_{constrainted} \end{bmatrix} \theta_{constrainted} + \begin{bmatrix} M_{free} \\ H_{free} \end{bmatrix} \theta_{free}$$

Equation 2

In Equation 2, $P=[P_x, P_y, P_z]^T$ denotes the linear momentum of the robot 100 and $L=[L_x, L_y, L_z]^T$ denotes the angular momentum of the robot 100.

In a first term of Equation 2, m denotes mass, E denotes a (3×3) identity matrix, I denotes a (3×3) inertia matrix, B denotes a base of mass, C denotes center of mass, $r_{b \to c}$ denotes a position vector from the base to the center of mass, and $v_B$ and $w_B$ respectively denote a speed and an angular speed.

A second term of Equation 2 is a joint (e.g., a leg or an arm) with a given constraint, for example, a joint which follows a given input. The momentum of the joint with the given constraint may be calculated by the constraint of the feet 111R and 111L or the hands 131R and 131L, without information about joints.

A third term of Equation 2 is a joint (e.g., an arm, a head, or a waist) which is freely moved to satisfy given momentum.

In order to calculate the linear momentum and the angular momentum by such a method, speed and inertia information is necessary. However, since the search of the RRT is performed in the C-Space, there is no speed information. However, if a time step Δt between two nodes is sufficiently small, it may be assumed that the two nodes are linearly connected. Accordingly, if a maximum value of a distance between the two nodes is determined when the two nodes are connected, the speed may be approximately obtained by a difference between the two nodes. For example, the speed of the joint with the given constraint is calculated using a closest node and a current node of FIG. 17 and the angular speed of the joint which may be freely moved is then obtained using Equation 2. Thereafter, the joint which may be freely moved is projected by linear approximation to satisfy a constraint.

By such a process, after sampling, the extended tree may be projected to satisfy the momentum.

Meanwhile, in order to maintain the balance of the robot 100, the ZMP as well as the COG needs to be within the supporting polygon. If the feet 111R and 111L of the robot 100 are moved, the motion of the robot 100 is more dynamic than the case where the feet 111R and 111L of the robot 100 are not moved, and the supporting polygon is also changed. Accordingly, necessity of considering the ZMP is increased.

If the position of a current COG is known and maximum force may be approximated from the information about the robot 100, a range of momentum satisfying the ZMP may be obtained. In addition, if the time step Δt between two nodes is sufficiently small, minimum and maximum values of momentum may be obtained.

A process of generating a path in consideration of such a dynamic constraint will be described with reference to FIG. 19.

Figure 19:
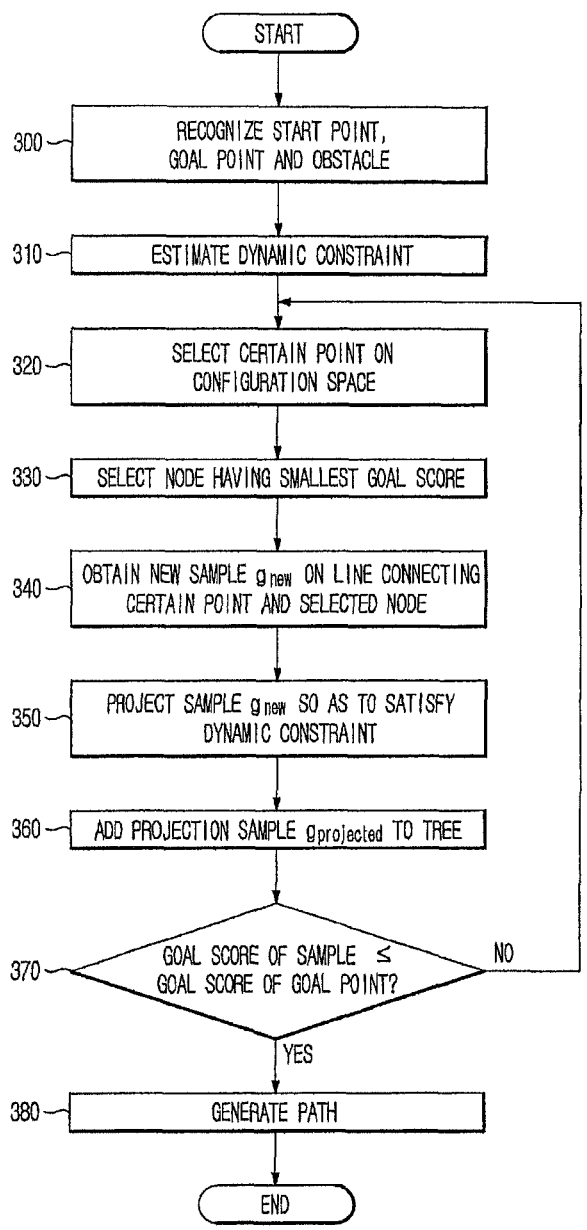
FIG. 19 is a flowchart illustrating a method of planning a path based on a sample in consideration of a dynamic constraint in a robot according to example embodiments.

FIG. 19 is a flowchart illustrating a method of planning a path based on a sample in consideration of a dynamic constraint in a robot according to example embodiments.

In FIG. 19, the path planning generator 210 recognizes information, which is given in order to enable the manipulator 130 to perform a task command, i.e., a configuration (start point S) at an initial position of the manipulator 130 before performing the task command, a configuration (goal point G) of a goal position of the manipulator 130 where the task command may be performed, and obstacles K placed between the start point S and the goal point G in a C-space using the recognizer 220 (300; see FIG. 6).

In addition, the path planning generator 210 estimates a dynamic constraint on the C-Space (310). In order to estimate the dynamic constraint, two nodes are connected in consideration of a speed relationship. If a maximum speed is 1 rad/sec and a time step between the two nodes is 0.05 sec, a maximum connection step of each node is 0.05 rad.

Subsequently, the path planning generator 210 randomly samples a certain point g in the case where a tree is generated in order to plan a motion path satisfying the dynamic constraint in the C-Space in which the start point S, the goal point G and the obstacles K are recognized and the dynamic constraint is estimated (320; see FIG. 7).

A node having a smallest goal score is selected from nodes belonging to a tree T from the randomly sampled point g (330). The randomly sampled point g and the node having the smallest goal score are connected by a dotted virtual line and a new sample $g_{new}$ separated from the randomly sampled point by a predetermined distance is obtained (340; see FIG. 8).

The new sample $g_{new}$ is projected to satisfy the dynamic constraint allowing a projection sample $g_{projected}$ to be obtained (350; see FIG. 17). The method of projecting the sample $g_{new}$ to satisfy the dynamic constraint will be described later with reference to FIG. 20.

The dynamic constraint of the projection sample $g_{projected}$ is checked and, if the dynamic constraint is satisfied, the projection sample $g_{projected}$ is added to a tree T1' (360; see FIG. 17). This process is repeatedly performed until the projection sample $g_{projected}$ is constantly extended and the tree T1' is extended.

In order to determine whether the projection sample $g_{projected}$ reaches the goal point after adding the projection sample $g_{projected}$ to the tree T1', the goal score of the projection sample $g_{projected}$ and the goal score of the goal point are compared to determine whether the goal score of the projection sample $g_{projected}$ equal to or less than the goal score of the goal point (370).

If it is determined that the goal score of the projection sample $g_{projected}$ is equal to or less than the goal score of the goal point in Operation 370, then it is determined that the projection sample $g_{projected}$ reaches the goal point to generate the path along which the manipulator 130 of the robot 100 moves from several nodes on the tree (380).

Accordingly, the path planning generator 210 searches for the motion path of the manipulator 130 using the above-described process and generates the path of the manipulator 130 in the graph searching operation. Thereafter, the robot controller 230 controls the driving unit 240 according to the generated path to control the movement of the manipulator 130.

Figure 20:
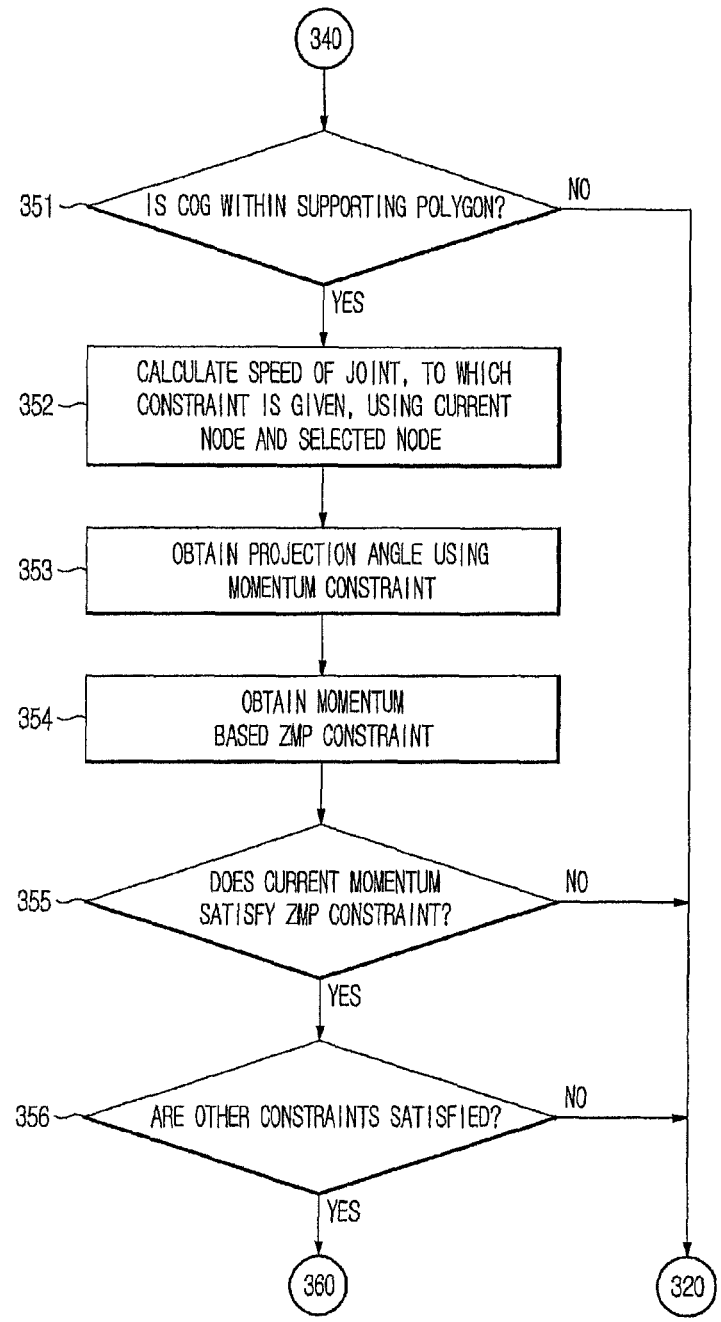
FIG. 20 is a flowchart illustrating a method of projecting a sample in consideration of a dynamic constraint in a robot according to example embodiments.

FIG. 20 is a flowchart illustrating a method of projecting a sample responsive to a dynamic constraint in a robot according to example embodiments.

In FIG. 20, it is determined whether the COG of the robot 100 is within a supporting polygon (351). If it is determined that the COG of the robot 100 is out of the supporting polygon, then the method progresses to operation 320 and the subsequent operations are performed.

If it is determined that the COG of the robot 100 is within the supporting polygon in operation 351, then the speed of a joint with a given constraint is calculated using a current node and a selected node (352).

Subsequently, a projection angle is obtained using a momentum constraint (353) and angular momentum is obtained based on a ZMP constraint (354).

It is determined whether current momentum obtained by such a method satisfies the ZMP constraint (355). If it is determined that the current momentum does not satisfy the ZMP constraint, then the method progresses to operation 320 and the subsequent operations are performed.

If it is determined that the current momentum satisfies the ZMP constraint in operation 355, it is determined whether other constraints are satisfied (356). If it is determined that the other constraints are not satisfied, then the method progresses to operation 320 and the subsequent operations are performed. The other constraints may include collision or desired constraints (e.g., movement on a z-plane) or a task space.

If it is determined that the other constraints are satisfied in operation 356, then the method progresses to Operation 360 and a projection sample $g_{projected}$ is added to the tree to extend the tree.

According to example embodiments, stable motion satisfying the momentum and ZMP constraints may be rapidly generated.

FIGS. 21 to 24 are simulation graphs showing a ZMP if a dynamic constraint is considered or is not considered.

Figure 21:
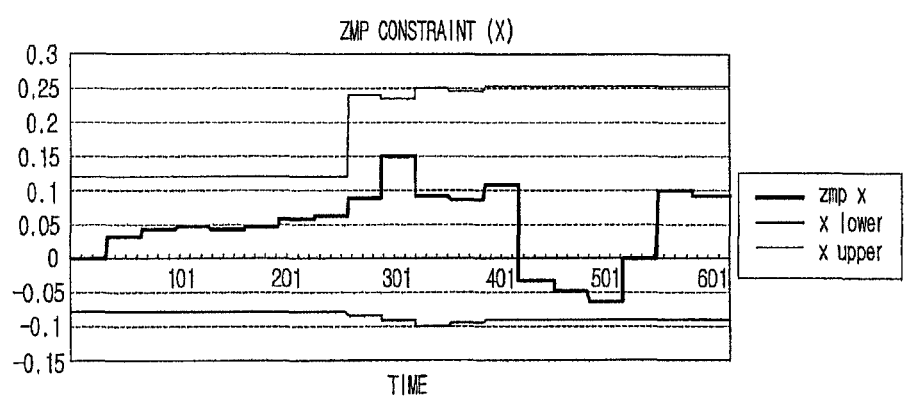
FIGS. 21 to 24 are simulation graphs showing a ZMP if a dynamic constraint is considered or is not considered.
Figure 22:
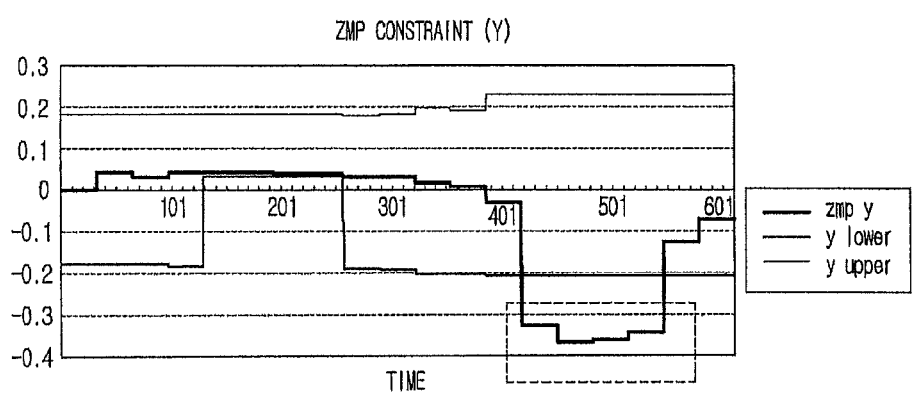

FIG. 21 is a simulation graph showing a ZMP of an X component when the dynamic constraint is not considered and FIG. 22 is a simulation graph showing a ZMP of a Y component when the dynamic constraint is not considered.

As shown in FIGS. 21 and 22, the ZMP of the X component is within upper and lower bounds of the supporting polygon, but the ZMP of the Y component is out of the upper and lower bounds of the supporting polygon (as denoted by a dotted line of FIG. 22).

Figure 23:
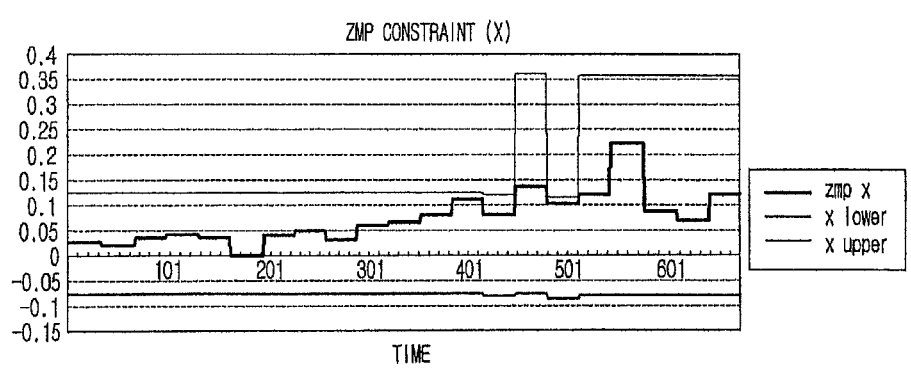
Figure 24:
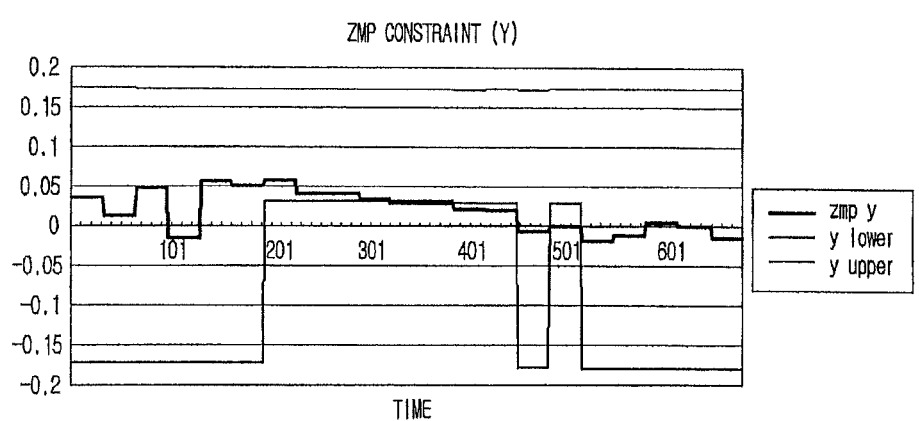

FIG. 23 is a simulation graph showing a ZMP of an X component when the dynamic constraint is considered and FIG. 24 is a simulation graph showing a ZMP of a Y component when the dynamic constraint is considered.

As shown in FIGS. 23 and 24, the ZMPs of the X component and the Y component are within upper and lower bounds of the supporting polygon while satisfying the constraint. Since the feet are not moved during operation, the supporting polygon is substantially equal to an initial configuration.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in the embodiments without departing from the principles and spirit of the disclosure, the scope of which is defined in the claims and their equivalents.

What is claimed is:

1. A method of planning a path of a robot, the method comprising:
   recognizing, by at least one processor, a start point and a goal point respectively corresponding to an initial configuration and a goal configuration of a manipulator of the robot;
   estimating, by the at least one processor, a dynamic constraint of the manipulator of the robot;
   searching, by the at least one processor, in configuration space for a path satisfying a constraint including obstacle avoidance from the start point to the goal point; and
   generating, by the at least one processor, a path satisfying the dynamic constraint from the searched path,
   wherein the dynamic constraint relates to at least one of speed and balance.

2. The method according to claim 1, wherein the dynamic constraint is set to a Center Of Gravity (COG) and one of a Zero Moment Position (ZMP) of the robot and an experimentally obtained momentum value.

3. The method according to claim 1, wherein the searching of the path includes:
   connecting a certain point randomly sampled in configuration space having the start point and the goal point and a node having a smallest goal score to obtain a sample $g_{new}$ satisfying the constraint;
   adding the sample $g_{new}$ to the tree to extend the tree until the sample $g_{new}$ reaches the goal point; and
   searching for the path to connect the start point and the goal point by the extension of the tree.

4. The method according to claim 3, wherein the generating of the path includes:
   projecting the sample $g_{new}$ responsive to the dynamic constraint;
   adding a projection sample $g_{projected}$ to the tree to generate a search graph to extend the tree; and
   connecting the start point and the goal point using the search graph to generate the path responsive to the dynamic constraint.

5. The method according to claim 4, wherein the projecting of the sample $g_{new}$ includes:
   checking whether a Center Of Gravity (COG) of the robot is within a supporting polygon to determine whether the sample $g_{new}$ satisfies static stability; and
   enabling a Zero Moment Position (ZMP) of the robot to fall within the supporting polygon to satisfy the dynamic stability of the robot.

6. The method according to claim 5, wherein the dynamic stability of the robot is satisfied by enabling the COG and the ZMP of the robot to fall within the supporting polygon to maintain balance of the robot.

7. An apparatus planning a path of a robot, the apparatus comprising:
   a recognizer configured to recognize a start point and a goal point respectively corresponding to an initial configuration and a goal configuration of a manipulator of the robot; and
   a path planning generator configured to form a configuration space to generate a motion path of the manipulator of the robot, to estimate a dynamic constraint of the manipulator of the robot in the configuration space, to search for a path in the configuration space which avoids an obstacle, and to generate a path to connect the start point and the goal point responsive to the dynamic constraint from the searched path, wherein the dynamic constraint relates to at least one of speed and balance.

8. The apparatus according to claim 7, wherein the path planning generator connects a certain point randomly sampled in the configuration space and a node having a smallest goal score to obtain a sample $g_{new}$ satisfying a constraint including obstacle avoidance, projects the sample $g_{new}$ responsive to the dynamic constraint, and adds a projection sample $g_{projected}$ to a tree to extend the tree.

9. The apparatus according to claim 8, wherein the dynamic constraint is set to a Center Of Gravity (COG) and one of a Zero Moment Position (ZMP) of the robot and an experimentally obtained momentum value.

10. The apparatus according to claim 8, wherein the path planning generator checks whether a Center Of Gravity (COG) of the robot is within a supporting polygon to determine whether the sample $g_{new}$ satisfies static stability, and projects the sample $g_{new}$ to satisfy dynamic stability of the robot if the sample $g_{new}$ satisfies the static stability.

11. The apparatus according to claim 10, wherein the dynamic stability of the robot is satisfied by enabling the COG and a Zero Moment Position (ZMP) of the robot to fall within the supporting polygon to maintain balance of the robot.

12. At least one non-transitory computer readable medium comprising computer readable instructions that control at least one processor to implement the method of claim 1.

* * * * *